(12) United States Patent
Kato

(10) Patent No.: US 11,978,969 B2
(45) Date of Patent: May 7, 2024

(54) WIRELESS COMMUNICATION DEVICE

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 414 days.

(21) Appl. No.: 17/351,432

(22) Filed: Jun. 18, 2021

(65) Prior Publication Data

US 2021/0313693 A1 Oct. 7, 2021

Related U.S. Application Data

(63) Continuation of application No. PCT/JP2019/038199, filed on Sep. 27, 2019.

(30) Foreign Application Priority Data

Dec. 25, 2018 (JP) ................. 2018-241507

(51) Int. Cl.
| | |
|---|---|
| *H01Q 1/38* | (2006.01) |
| *H01Q 1/42* | (2006.01) |
| *H01Q 5/371* | (2015.01) |
| *H01Q 7/02* | (2006.01) |

(52) U.S. Cl.
CPC ............. *H01Q 7/02* (2013.01); *H01Q 1/38* (2013.01); *H01Q 1/422* (2013.01); *H01Q 5/371* (2015.01)

(58) Field of Classification Search
CPC .......... H01Q 1/422; H01Q 1/38; H01Q 5/371; H01Q 7/02
See application file for complete search history.

(56) References Cited

U.S. PATENT DOCUMENTS

| | | | | |
|---|---|---|---|---|
| 2008/0149731 A1* | 6/2008 | Arai | .................. | H01L 27/13 |
| | | | | 257/E27.113 |
| 2009/0121876 A1* | 5/2009 | Satoh | ............... | G06K 19/07726 |
| | | | | 340/568.2 |
| 2013/0306743 A1 | 11/2013 | Yamanaka et al. | | |
| 2017/0270401 A1* | 9/2017 | Kato | ............... | G06K 19/07758 |
| 2018/0189623 A1 | 7/2018 | Forster et al. | | |

(Continued)

FOREIGN PATENT DOCUMENTS

| | | |
|---|---|---|
| JP | 2005235191 A | 9/2005 |
| JP | 2006338563 A | 12/2006 |
| JP | 2008003682 A | 1/2008 |

(Continued)

OTHER PUBLICATIONS

International Search Report issued for PCT/JP2019/038199, dated Dec. 17, 2019.

(Continued)

*Primary Examiner* — Graham P Smith
(74) *Attorney, Agent, or Firm* — Arentfox Shiff LLP

(57) ABSTRACT

A wireless communication device transmits and receives a high-frequency signal having a first frequency as a carrier frequency. The device includes a base material made of paper, an antenna pattern of an Sn alloy formed on the base material, and an RFIC element connected electrically to the antenna pattern. Moreover, the antenna pattern including a thin wire part and a thick wire part that differ in wire width from each other.

20 Claims, 12 Drawing Sheets

(56) References Cited

U.S. PATENT DOCUMENTS

2019/0081402 A1  3/2019  Kato

FOREIGN PATENT DOCUMENTS

| | | |
|---|---|---|
| JP | 2009009591 A | 1/2009 |
| JP | 2011182392 A | 9/2011 |
| JP | 2018163643 A | 10/2018 |
| WO | 2018194173 A1 | 10/2018 |

OTHER PUBLICATIONS

Written Opinion of the International Searching Authority issued for PCT/JP2019/038199, dated Dec. 17, 2019.

* cited by examiner

WIRELESS COMMUNICATION DEVICE

CROSS REFERENCED TO RELATED APPLICATIONS

The present application is a continuation of PCT/JP2019/038199 filed Sep. 27, 2019, which claims priority to Japanese Patent Application No. 2018-241507, filed Dec. 25, 2018, the entire contents of each of which are incorporated herein by reference.

TECHNICAL FIELD

The present invention relates to a wireless communication device having an antenna, and, more particularly, to a wireless communication device utilizing radio frequency identification (RFID) technology for contactless data communication by induced electromagnetic fields or radio waves.

BACKGROUND

Currently, goods accounting has been automated by attaching RFID tags as wireless communication devices to articles as goods. According to this automated checkout system, when a basket containing goods with RFID tags is placed on a checkout counter, information from the RFID tags read so that the goods price is displayed.

In general, a wide variety of goods are sold at stores such as supermarkets and some of food items as goods may be warmed up directly after purchasing the goods so as to be eaten and drunk immediate on the spot by the purchaser. Examples of goods to be warmed up for eating and drinking like this include food items such as box lunches and cup noodles. These goods can be heated at stores using an electromagnetic wave heating device, such as a microwave oven.

The RFID tag includes a resin base material on which are formed a radio-frequency integrated circuit (RFIC) chip and a metal material such as an antenna pattern that is a metal film. When heating goods with such an RFID tag attached thereto by a microwave oven, e.g., in the case of warming up a box lunch with an RFID tag, electromagnetic waves are absorbed by the RFID tag together with the box lunch. As a result, discharge or overcurrent occurs at the metal material portion of the RFID tag due to concentration of electric field. In consequence, the metal itself is heated and sublimates, which may cause the base material of the RFID tag to burn, resulting in ignition of the RFID tag.

With the purpose of reducing the ignition of the RFID tag as described above, JP-A-2006-338563 (hereinafter "Patent Document 1") has proposed a flame-retardant tag configuration, In the "flame-retardant tag" disclosed in Patent Document 1, the base material mounted with the RFIC chip and the antenna pattern is configured of a flame-retardant material. Because of use of the flame-retardant resin material as the base material, even if the base material ignites, the fire is extinguished in a few seconds to a few tens of seconds. However, use of the flame-retardant resin material leads to a higher cost, which has been an obstacle to widespread use of the RFID tags.

SUMMARY OF THE INVENTION

The present invention provides a low-cost wireless communication device constructed to prevent ignition of goods with the wireless communication device even if the goods are irradiated with electromagnetic waves having a higher frequency than a predetermined communication frequency.

Thus, a wireless communication device of the present invention is provided for transmitting and receiving a high-frequency signal having a first frequency as a carrier frequency. The wireless communication device includes a base material made of paper; an antenna pattern made of an Sn alloy and formed on the base material; and an RFIC element connected electrically to the antenna pattern. Moreover, the antenna pattern includes a thin wire part and a thick wire part each having a different wire width.

According to the exemplary embodiments of the present invention, a low-cost wireless communication device is provided that prevents ignition of goods with the wireless communication device even if the goods with the wireless communication device are irradiated with electromagnetic waves having a higher frequency than a predetermined communication frequency.

DETAILED DESCRIPTION

Figure 1:
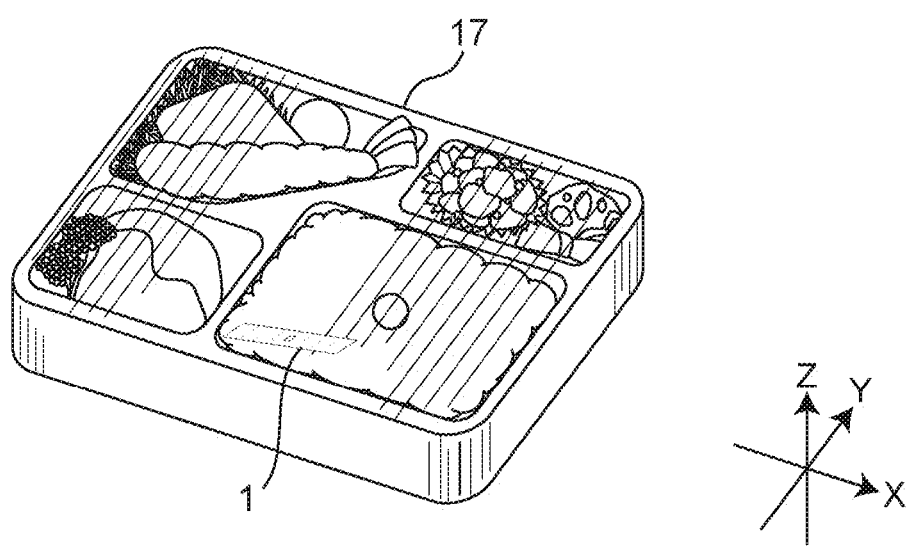
FIG. 1 is a view showing an example where a wireless communication device of a first exemplary embodiment is attached to an article.

A wireless communication device of an exemplary aspect is PROVIDED for transmitting and receiving a high-frequency signal having a first frequency as a carrier frequency. In this aspect, the wireless communication device includes a base material made of paper; an antenna pattern made of an Sn alloy, formed on the base material; and an RFIC element connected electrically to the antenna pattern. Moreover, the antenna pattern includes a thin wire part and a thick wire part each having a different wire width.

By forming on the base material the antenna pattern having a melting point lower than the ignition point of the base material, the wireless communication device is constructed to prevent goods with the wireless communication device from igniting even when irradiated with an electromagnetic wave of a frequency higher than the predetermined communication frequency. Since disconnection easily occurs due to heat in the thin wire part rather than the thick wire part when induced current flows through the antenna pattern, locations of disconnection can be set in advance. Since the wireless communication device uses the paper base material, cost reduction can be implemented as compared with the case of using an expensive heat-resistant resin.

In the exemplary aspect, the antenna pattern can include a plurality of the thin wire parts. By providing the antenna pattern with the plurality of thin wire parts, a plurality of locations of disconnection can be set in advance. Since the antenna length receiving electromagnetic waves becomes short every time the wire breaks, energy received by the antenna pattern can be reduced.

The antenna pattern can include a main antenna pattern of a meandering shape and a branch pattern branching from the main antenna pattern at turning parts of the meandering shape, and the branch pattern can extend toward a side opposite to a direction of extension of the meandering shape. The branch pattern extending toward the opposite side to the extension direction of the meandering shape is capacitive coupled with part of the main antenna pattern lying inside in the longitudinal direction of the branched turning parts. Consequently, the branch pattern forms the resonant circuit with a high-frequency wave higher than the first frequency, not having any influence at the first frequency.

In an exemplary aspect, the branch pattern can be formed between the turning parts adjacent to each other. Moreover, the branch pattern and part of the main antenna pattern can form a loop circuit resonating with a high-frequency wave of a second frequency higher than the first frequency, and the number of the loop circuits may be even. This configuration enables creation of an even number of resonant circuits for an electromagnetic wave of a higher frequency than the high-frequency signal of the first frequency. As a result, when receiving an electromagnetic wave of a higher frequency than the high-frequency signal of the first frequency, current flowing through the antenna pattern can generate a closed magnetic field between adjacent resonant circuits. Since this closed magnetic field cannot magnetic field couple with the irradiated electromagnetic wave, the antenna pattern is prevented from receiving the irradiated electromagnetic wave as magnetic field energy.

In an exemplary aspect, the branch pattern can include a first branch pattern and a second branch pattern each having a different length. By imparting a different length to the branch pattern, the resonance frequency can be changed. By including the branch patterns with different lengths setting different resonance frequencies, the antenna pattern can be constructed to resonate as a resonance frequency band. Hereby, for example, even if the electric length of the antenna pattern becomes short under the influence of the dielectric of goods to which the RFID tag is attached, the antenna pattern can resonate with an electromagnetic wave of a higher frequency than the high-frequency signal of the first frequency.

A connecting portion between the main antenna pattern and the branch pattern may be the thin wire part in one exemplary aspect. This configuration enables the connecting portion between the main antenna pattern and the branch pattern to break when receiving an electromagnetic wave of a higher frequency than the high-frequency signal of the first frequency.

Moreover, a corner of the main antenna pattern may be the thin wire part. This configuration allows a break to occur at a corner of the antenna pattern where current concentrates easily when receiving an electromagnetic wave of a higher frequency than the high-frequency signal of the first frequency, whereby the antenna pattern can be prevented from igniting.

A central portion in an amplitude direction of a meander of the main antenna pattern may be the thin wire part in one exemplary aspect. This configuration allows a break to occur at the central portion in the amplitude direction of the meander of the main antenna pattern when receiving an electromagnetic wave of a higher frequency than the high-frequency signal of the first frequency, whereby the antenna pattern can be shortened.

A looped conductor pattern may be disposed along the main antenna pattern of the meander shape in one exemplary aspect. Since a parallel resonant circuit including part of the main antenna pattern is composed of the looped conductor pattern and the main antenna pattern parallel resonant circuit to form a magnetic field antenna, when the substrate is irradiated with an electromagnetic wave of a higher frequency than the high-frequency signal of the first frequency, the electromagnetic wave can be reflected as magnetic field energy.

The thin wire part of the antenna pattern can also be arranged at a location where a voltage occurring at the antenna pattern is maximized when receiving a high-frequency wave of a second frequency higher than the first frequency. This configuration allows the thin wire part to break before being heated excessively since the thin wire part is the location where voltage is maximized, whereby the base material 3 can be prevented from burning.

The thin wire part of the antenna pattern may be arranged at a location where a current flowing through the antenna pattern is maximized when receiving a high-frequency wave of a second frequency higher than the first frequency. This configuration allows the thin wire part to break before being heated excessively since the thin wire part is the location where current is maximized, whereby the base material can be prevented from burning.

The second frequency may also be a frequency used in electromagnetic wave heating in one exemplary aspect. Even if the wireless communication device is irradiated with a high-frequency wave of a frequency used in electromagnetic wave heating, goods with the wireless communication device can be prevented from burning.

The first frequency may be a frequency in a UHF band, for example. If the first frequency is a frequency in the UHF band, a wireless communication device having a long communication distance can be implemented.

The branch pattern may be capacitive coupled with part of the main antenna pattern so that the branch pattern and the part of the main antenna pattern can form a loop circuit parallel-resonating with a high-frequency wave of a second frequency higher than the first frequency. As a result, the loop circuit composed of the branch pattern and the part of the main antenna pattern can resonate with the high-frequency wave of the second frequency.

Hereinafter, exemplary embodiments as specific exemplifications of a wireless communication device according to the present invention will be described with reference to the accompanying drawings. In the drawings, members having substantially the same functions and configurations are designated by the same reference numerals, explanation of which may be omitted in the specification. For ease of understanding, the drawings are diagrammatically shown mainly about their respective constituent elements.

It is noted that the exemplary embodiments described below are each a specific example of the present invention and that the present invention is not limited to configurations thereof. Numerical values, shapes, configurations, steps, and step sequencing specifically shown in the following embodiments are examples and do not limit the present invention. In all the embodiments, similar configurations apply to their variants and the configurations described in the variants may be combined with one another.

For purposes of this disclosure, examples of goods with the wireless communication device of the present invention include all of goods sold in stores such as "convenience stores" and "supermarkets". Although the electromagnetic wave heating devices described in the following embodiments will be described using the "microwave oven" performing electric heating as an example, the electromagnetic wave heating devices of the present invention apply to heating devices having a function of performing dielectric heating. It is noted that the exemplary embodiments of the present invention are related to a goods sales system in which the wireless communication device having the same configuration is attached to all the goods.

When the relative permittivity of an antenna base material is $\varepsilon r>1$, the electrical length of an antenna Pattern. and a conductor pattern is longer than the physical length. In this specification, the physical length refers to a wire length formed on the antenna base material. The electrical length refers to a length considering shortening or extension of wavelength due to the relative permittivity and parasitic reactance components.

First Exemplary Embodiment

A usage form of an RFID tag 1 as a wireless communication device according to the exemplary embodiment will first be described. FIG. 1 is a view showing an example where the wireless communication device of a first exemplary embodiment is attached to an article. The RFID tag 1 is attached to, for example, a box lunch as the article. It is noted that the RFID tag 1 may be attached to an article 17 in any direction.

Figure 2:
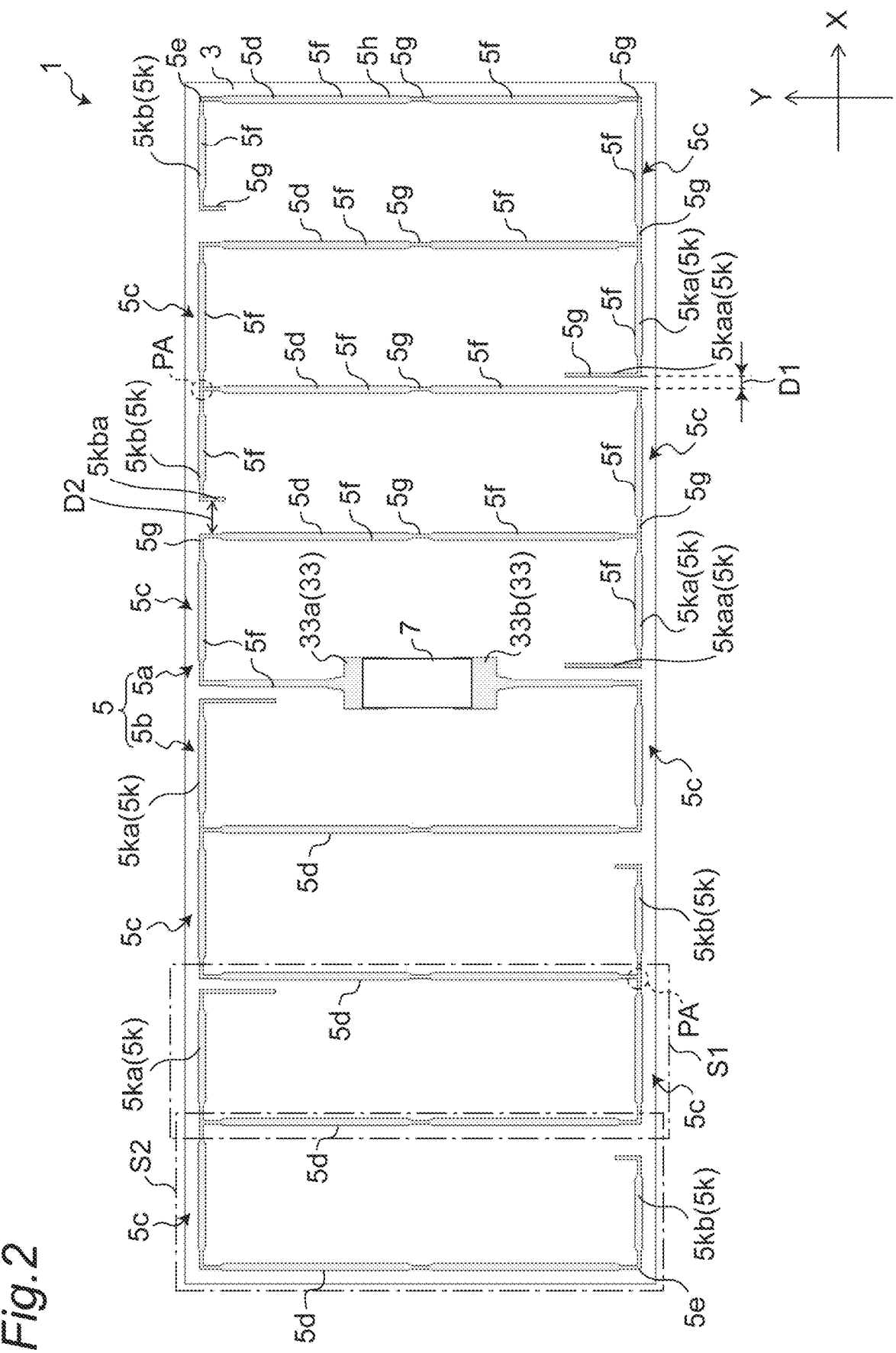
FIG. 2 is a plan view showing the wireless communication device of the first exemplary embodiment.

Referring then to FIG. 2, a schematic configuration of the RFID tag 1 will be described. FIG. 2 is a plan view showing the RFID tag 1 that is the wireless communication device of the first embodiment. In the diagrams, the X-Y-Z coordinate system is for the purpose of facilitating the understanding of the exemplary embodiments and is not intended to limit the invention. The X axis direction indicates the longitudinal direction of the RFID tag 1, the Y axis direction indicates the width direction, and the Z axis direction indicates the thickness direction. The X, Y, and Z directions are orthogonal to one another.

The RFID tag 1 is configured to perform wireless communication (transmission/reception) with high-frequency signals having a communication frequency (carrier frequency) and has a configuration configured for wireless communication in a wide frequency band. The RFID tag 1 comprises a base material 3, an antenna pattern 5 formed on the base material 3, and an RFIC package 7 connected electrically to the antenna pattern 5.

The RFID tag 1 is configured to perform wireless communication with high-frequency signals having a UHF-band communication frequency for example. As used herein, the UHF band is a frequency band of 860 MHz to 960 MHz. The UHF-band communication frequency is an example of "first frequency" and "carrier frequency" in the present disclosure.

According to the exemplary embodiment, paper is used as the base material 3. Paper is, for example, paper such as craft paper. The base material 3 is not limited to a rectangle as shown in FIG. 2 but may be an ellipse or a circle. Flame-retardant paper or fiberglass paper may be used as the base material 3. The thickness of the base material 3 is for example 80 µm. The ignition point of the paper base material 3 is approximately 300° C. The dimensions of the base material 3 are, for example, 18.4 mm in the width direction and 47 mm in the longitudinal direction in an exemplary aspect.

The antenna pattern 5 made of a tin (Sn) alloy film is formed on a surface of the base material 3. The tin alloy contains, for e ample, 90% tin and several copper. This configuration enables the melting point of the antenna pattern 5 to be set to about 220° C. to 230° C. so that the melting point of the antenna pattern. 5 can be lower than the ignition point of the base material 3.

The antenna pattern 5 is disposed with two land patterns 33 (33a and 33b) in contact with the RFIC package 7 for electrical connection therewith. This allows an RFIC chip 37 included in the RFIC package 7 to be connected electrically to the antenna pattern 5. The electrical connection means not only the case of being connected in a direct current manner, but also being connected or coupled to each other so as to be operable with the high-frequency signals transmitted by electric fields or magnetic fields, without being limited to the connection in a direct current manner.

The antenna pattern 5 has a first antenna pattern 5a extending outward in the longitudinal direction from the first land pattern 33a connected to one end of the RFIC package 7 and a second antenna pattern 5b extending in the opposite direction to the first antenna pattern 5a from the second land pattern 33b connected to the other end of the RFIC package 7. The antenna pattern 5 is configured as a dipole antenna by the first and second antenna patterns 5a and 5b. As also shown, the first and second antenna patterns 5a and 5b are each arranged in a point-symmetric relation with respect to a substantial center of the base material 3.

The antenna pattern 5 is a field emission type antenna pattern. The first and second antenna patterns 5a and 5b have a meandering shape that meanders with a plurality of turning parts 5c from the land pattern 33. The turning parts 5c of the antenna pattern 5 are portions where the direction of extension of the antenna pattern 5 is reversed.

The first antenna pattern 5a has a substantially linear shape pattern. The first antenna pattern 5a has a main antenna pattern 5h extending in a meandering manner from the first land pattern 33a toward one end in the longitudinal direction (+X direction) of the base material 3, and a branch pattern 5k branching from the main antenna pattern 5h. A tip 5e in the direction of extension of the main antenna pattern 5h lies at one end in the longitudinal direction of the base material 3. A branch pattern 5kb extends from the tip 5e of the main antenna pattern 5h. The direction of extension of the meandering shape is a direction extending while meandering and is the longitudinal direction (X direction) of the base material 3.

The second antenna pattern 5b has a substantially linear shape pattern. The second antenna pattern 5b has a main antenna pattern 5h extending in a meandering manner from the second land pattern 33b toward the other end in the longitudinal direction (−X direction) of the base material 3, and a branch pattern 5k branching from the main antenna pattern 5h. A tip 5e in the direction of extension of the second antenna pattern 5b lies in the vicinity of the other end in the longitudinal direction of the base material 3. A branch pattern 5kb extends from the tip 5e of the main antenna pattern 5h.

According to the exemplary embodiment, the total electrical length as the sum of the lengths of the respective main antenna patterns 5h of the first and second antenna patterns 5a and 5b has at least substantially the same length as the half wavelength of a high-frequency signal of a first frequency for communication. The total electrical and physical lengths of the respective main antenna patterns 5h of the first and second antenna patterns 5a and 5b are designed for transmission/reception of the high-frequency signal of the first frequency that is used as a carrier frequency for communication.

Figure 3:
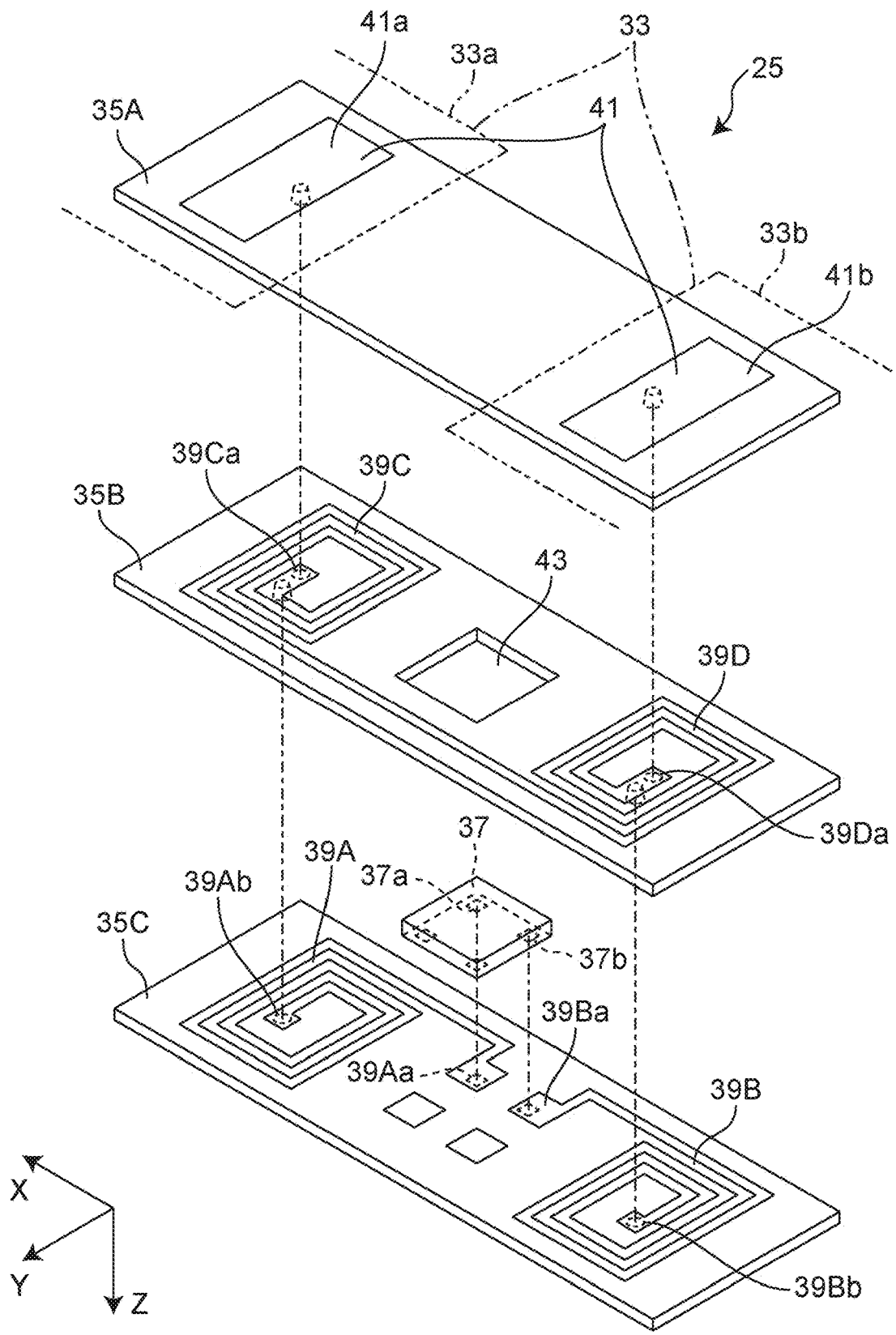
FIG. 3 is an exploded perspective view of an RFIC package in the wireless communication device of the first exemplary embodiment.

FIG. 3 is an exploded perspective view showing a configuration of the RFIC package 7 mounted on the land pattern 33 (33a, 33b) of the antenna pattern 5. As shown in FIG. 3, the RFIC package 7 in the first embodiment is configured from a multi-layered substrate including three layers. Specifically, the multi-layered substrate of the RFIC package 7 is made of a resin material such as polyimide and liquid crystal polymer and is configured by laminating three insulating sheets 35A, 35B, and 35C having a flexibility. The insulating sheets 35A, 35B, and 35C are substantially quadrangular in plan view and are of a substantially rectangular shape in the first embodiment. The RFIC package 7 of FIG. 3 shows a state where the RFIC package 7 of FIG. 2 is turned over with the three layers shown separately.

As shown in FIG. 3, the RFIC package 7 includes, at predetermined positions on the three-layered substrate (insulating sheets 35A, 35B, and 35C), the RFIC chip 37, a plurality of inductance elements 39A, 39B, 39C, and 39D, and an external connection terminal 41 (41a, 41b) connected to the antenna pattern 5.

Figure 4:
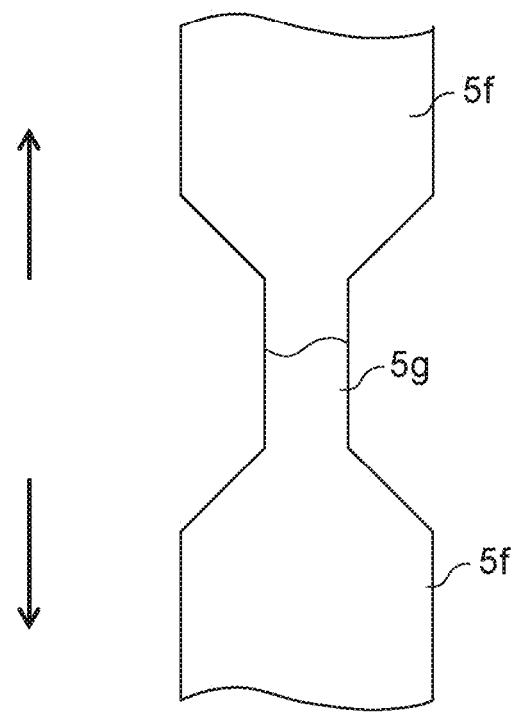
FIG. 4 is an enlarged view around a thin wire part of an antenna pattern.

The external connection terminal 41 (41a, 41b) is formed on the first insulating sheet 35A as the lowermost layer (substrate facing the antenna pattern 5) and is formed at a position facing the land pattern 33 (33a, 33b) of the antenna pattern 5. The four inductance elements 39A, 39B, 39C, and 39D are formed separately in twos on the second insulating sheet 35B and the third insulating sheet 35C. That is, the first inductance element 39A and the second inductance element 39B are formed on the third insulating sheet 35C as the uppermost layer (layer indicated at the lowermost position in FIG. 4), while the third inductance element 39C and the fourth inductance element 39D are formed on the second insulating sheet 35B as the intermediate layer.

In the RFIC package 7 of the first embodiment, the external connection terminal 41 (41a, 41b) and the four inductance elements 39A, 39B, 39C, and 39D are configured from conductor patterns made of a conductive material such as aluminum foil and copper foil.

As shown in FIG. 3, the RFIC chip 37 is mounted at a central portion in the longitudinal direction (X direction in FIG. 3) on the third insulating sheet 35C that is the uppermost layer. The RFIC chip 37 has a structure in which various elements are built in a semiconductor substrate made of a semiconductor such as silicon. The first inductance element 39A formed spirally on one side (+X axis direction in FIG. 3) on the third insulating sheet 35C is connected via a land 39Aa to an input/output terminal 37a on one hand of the RFIC chip 37. The second inductance element 39B formed spirally on the other side (−X axis direction in FIG. 3) on the third insulating sheet 35C is connected via a land 39Ba to an input/output terminal 37b on the other of the RFIC chip 37.

The third inductance element 39C in spiral shape is formed on one side (+X axis direction in FIG. 3) on the second insulating sheet 35B that is the intermediate layer, while the fourth inductance element 39D in spiral shape is formed on the other side (−X axis direction in FIG. 3) on the second insulating sheet 35B. An outer peripheral end of the third inductance element 39C in spiral shape and an outer peripheral end of the fourth inductance element 39D in spiral shape are connected directly. On the other hand, an inner peripheral end (land 39Ca) of the third inductance element 39C is connected, via an interlayer connecting conductor such as a through-hole conductor passing through the second insulating sheet 35B, to an inner peripheral end (land 39Ab) of the first inductance element 39A in spiral shape on the third insulating sheet 35C. The inner peripheral end (land 39Ca) of the third inductance element 39C is connected, via an interlayer connecting conductor such as a through-hole conductor passing through the first insulating sheet 35A as the lowermost layer, to the first external connection terminal 41a on the first insulating sheet 35A.

As further shown, an inner peripheral end (land 39Da) of the fourth inductance element 39D is connected, via an interlayer connecting conductor such as a through-hole conductor passing through the second insulating sheet 35B, to an inner peripheral end (land 39Bb) of the second inductance element 39B in spiral shape on the third insulating sheet 35C. The inner peripheral end (land 39Da) of the fourth inductance element 39D is connected, via an interlayer connecting conductor such as a through-hole conductor passing through the first insulating sheet 35A as the lowermost layer, to the second external connection terminal 41b on the first insulating sheet 35A.

The first external connection terminal 41a on the first insulating sheet 35A is arranged so as to be connected to the first land pattern 33a of the first antenna pattern 5a formed on the base material 3. Similarly, the second external connection terminal 41b on the first insulating sheet 35A is arranged so as to be connected to the second land pattern 33b of the second antenna pattern 5b formed on the base material 3.

The second insulating sheet 35B as the intermediate layer is formed with a through-hole 43 that receives the RFIC chip 37 mounted on the third insulating sheet 35C. The RFIC chip 37 is formed of a semiconductor material and is arranged between the first inductance element 39A and the second inductance element 39B and between the third inductance element 39C and the fourth inductance element 39D. For this reason, the RFIC chip 37 functions as a shield so that magnetic field coupling and capacitive coupling between the first inductance element 39A and the second inductance element 39B are suppressed and similarly so that magnetic field coupling and capacitive coupling between the third inductance element 39C and the fourth inductance element 39D are suppressed. As a result, the RFIC package 7 of the first embodiment restrains the pass band of the communication signal from becoming narrower, rendering the pass band wider.

Although in the first embodiment the mode has been exemplified where the RFIC package 7 is mounted on the antenna pattern 5, the RFIC chip 37 may be mounted directly on the antenna pattern 5. At this time, inductors configured as the plurality of inductance elements 39A, 39B, 39C, and 39D in the RFIC package 7 may be configured as a looped pattern on the base material 3.

Referring to FIG. 2, the antenna pattern 5 will again be described. The first and second antenna patterns 5a and 5b have rectilinear parts 5d that are parallel to the width direction (Y direction) of the base material 3 and extend in the amplitude direction of the meander. The rectilinear parts 5d are pattern parts connecting the turning parts 5c facing each other in the width direction and may be curved wires without being limited to the rectilinear shape. The thickness of the antenna pattern 5 is 10 μm to 50 μm according to an exemplary aspect.

Furthermore, the first and second antenna patterns 5a and 5b each have thick wire parts 5f and thin wire parts 5g. The wire width of the thick wire parts 5f is broader than that of the thin wire parts 5g and is, for example, 400 μm. The thin wire parts 5g have a cross-sectional area that does not allow melting with a current flowing when transmitting/receiving a high-frequency signal of the first frequency. The thin wire parts 5g have a cross-sectional area that allows melting with a current flowing when receiving a high-frequency wave higher than the first frequency. For example, the wire width of the thin wire parts 5g is 150 μm according to the exemplary aspect. Since the thin wire parts 5g need only to have a cross-sectional area smaller than that of the thick wire parts 5f, the thin wire parts 5g may be configured to have a thickness smaller than that of the thick wire parts 5f without being limited to the wire width.

The first and second antenna patterns 5a and 5b are formed mainly from the thick wire parts 5f and partially have the plurality of thin wire parts 5g. The thin wire parts 5g are arranged at central portions of the rectilinear parts 5d and at corners of the turning parts 5c. By forming a thin wire part 5g between two or three thick wire parts 5f in this manner, when a thin wire part 5g melts, the melted Sn alloy is pulled toward the thick wire parts 5f so that disconnection at the thick wire part 5g can be promoted (see FIG. 4).

The branch pattern 5k extends toward the side opposite to the direction of extension of the meandering shape. In other words, the branch pattern 5k extends inward from the inside in the longitudinal direction of the turning parts 5c of the meandering main antenna pattern 5h. Connecting points between the branch pattern 5k and the turning parts 5c are formed as thin wire parts 5g. The branch pattern 5k extends inward in the longitudinal direction from the connecting points with the turning parts 5c and further extends inward in the width direction while facing the rectilinear parts 5d extending from the turning parts 5c lying inside in the longitudinal direction of the turning parts 5c from which the branch pattern 5k branches. In this manner, the branch pattern 5k has an L-shape.

The branch pattern 5k includes a first branch pattern 5ka and a second branch pattern 5kb that differ in length. The first branch pattern 5ka and the second branch pattern 5kb have different distances from facing rectilinear parts 5d. A distance D1 between a facing part 5kaa facing a rectilinear part 5d in the first branch pattern 5ka and the rectilinear part 5d is shorter than a distance D2 between a facing part 5kba facing a rectilinear part 5d in the second branch pattern 5kb and the rectilinear part 5d. The length of the facing part 5kaa of the first branch pattern 5ka is longer than the length of the facing part 5kba of the second branch pattern 5kb. Accordingly, the value of capacitance C1 by the first branch pattern 5ka is larger than the value of capacitance C2 by the second branch pattern 5kb. Since a resonant circuit S1 including the first branch pattern 5ka and a resonant circuit S2 including the second branch pattern 5kb have different capacitance values in this manner, the receivable band of the antenna pattern 5 as a whole can be expanded.

Since the thin wire parts 5g have a resistance higher than that of the thick wire parts 5f in the antenna pattern 5, when receiving a high-frequency wave of a second frequency higher in frequency than the first frequency, the thin wire parts 5g have a raised temperature and easily melt open due to induced current flowing though the antenna pattern 5a. Thus, by arranging the thin wire parts 5g at locations to be disconnected in the antenna pattern 5 at the stage of designing the antenna pattern, the disconnection locations can be adjusted.

Figure 5:
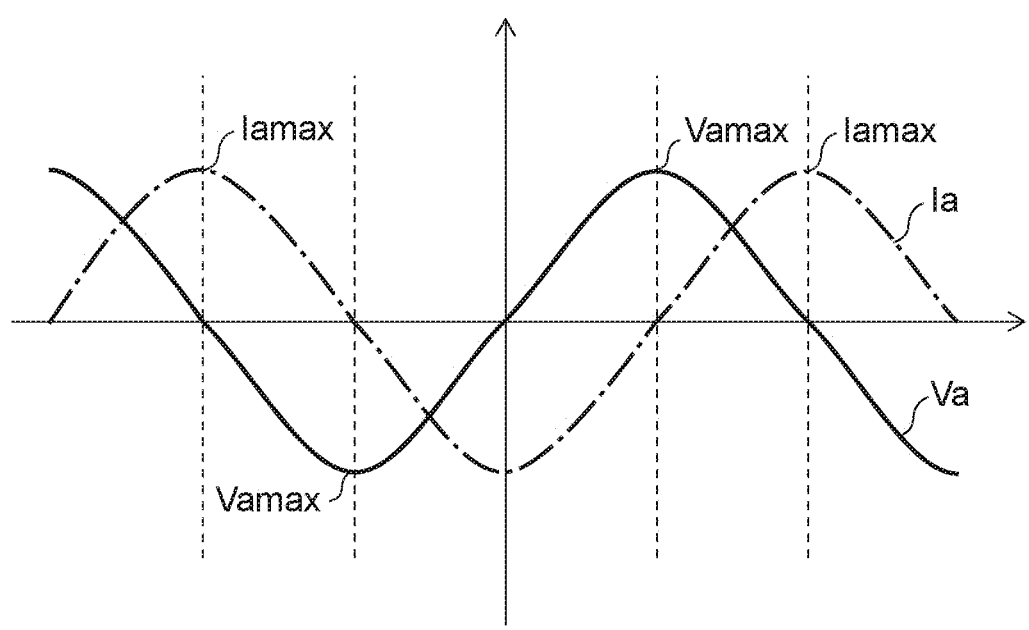
FIG. 5 is a graph showing voltage and current of induced current flowing through the antenna pattern.

According to the exemplary aspect, the thin wire parts 5g are arranged at locations where voltage generated at the antenna pattern 5 is maximized when receiving a high-frequency wave of the second frequency. Description will be given with reference also to FIG. 5, which is a graph of voltage and current generated in the antenna pattern 5 when receiving a high-frequency wave of the second frequency higher than the first frequency. The electric length of the antenna pattern 5 can be designed for the high-frequency wave of the second frequency so that a standing wave occurs when receiving the high-frequency wave of the second frequency.

Thus, by arranging the thin wire parts 5g at locations where the voltage standing wave reaches a maxim voltage Vamax, the thin wire parts 5g can be disconnected immediately due to heat when a voltage occurs in the antenna pattern 5. This configuration prevents an excessive voltage from being applied continuously to the antenna pattern 5. Here, the maximum voltage Vamax is a maximum value as the value of absolute value.

The thin wire parts 5g are arranged at locations where current flowing through the antenna pattern 5 is maximized when receiving a high-frequency wave of the second frequency higher than the first frequency. Accordingly, when current starts to flow through the antenna pattern 5, the thin wire parts 5g of a maximum current Iamax can be disconnected immediately due to heat, thereby making it possible to prevent an excessive current from flowing continuously through the antenna pattern 5. Subsequently, the thin wire parts 5g are disconnected one after another and subdivided, rendering impossible to receive the high-frequency wave of the second frequency. As a result, the disconnected antenna pattern 5 and the base material 3 do not receive energy of the high-frequency wave of the second frequency, so that the antenna pattern 5 and the base material 3 are not caused to burn.

Figure 6:
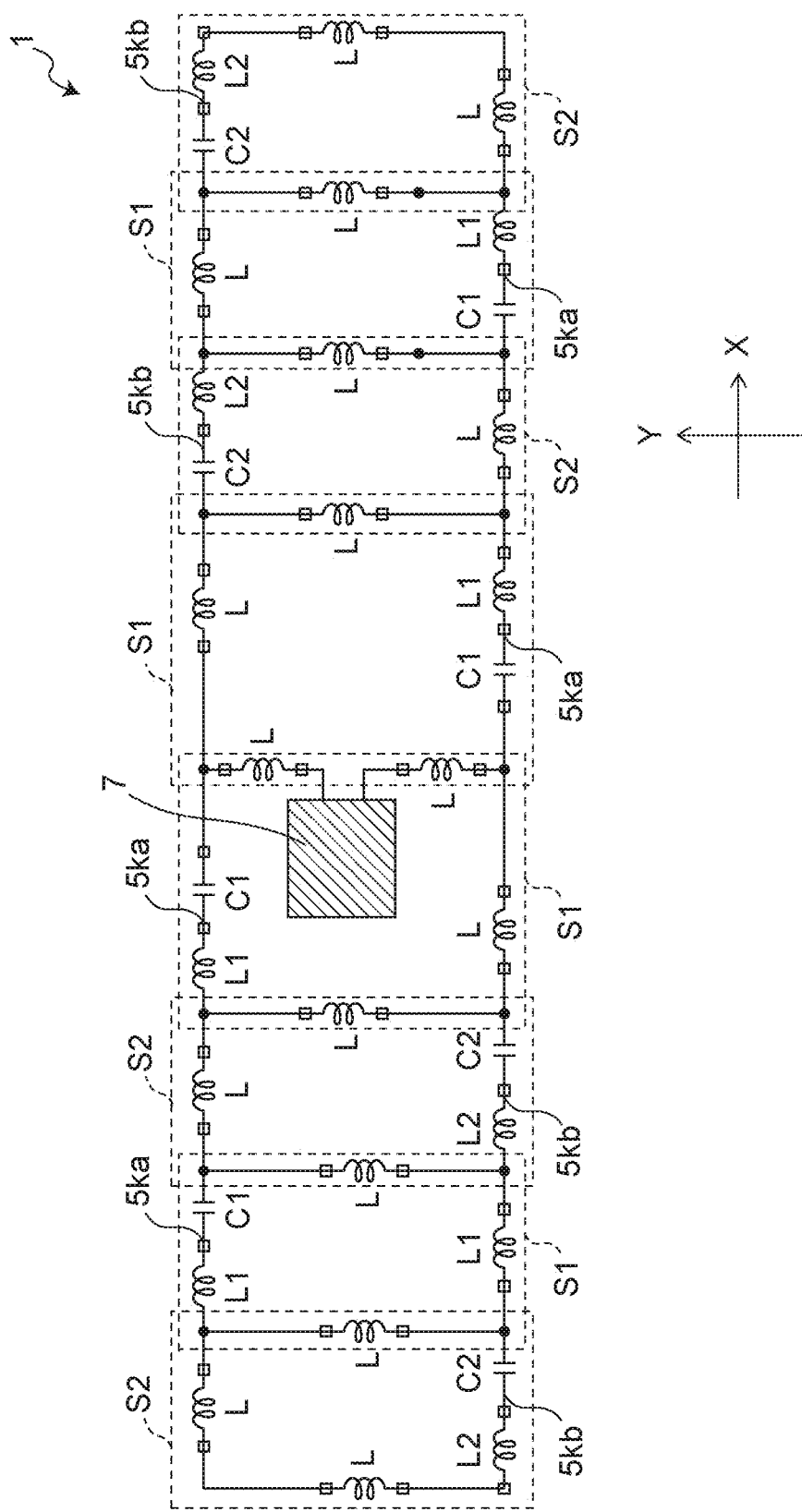
FIG. 6 is a diagram showing an equivalent circuit of the antenna pattern
Figure 7:
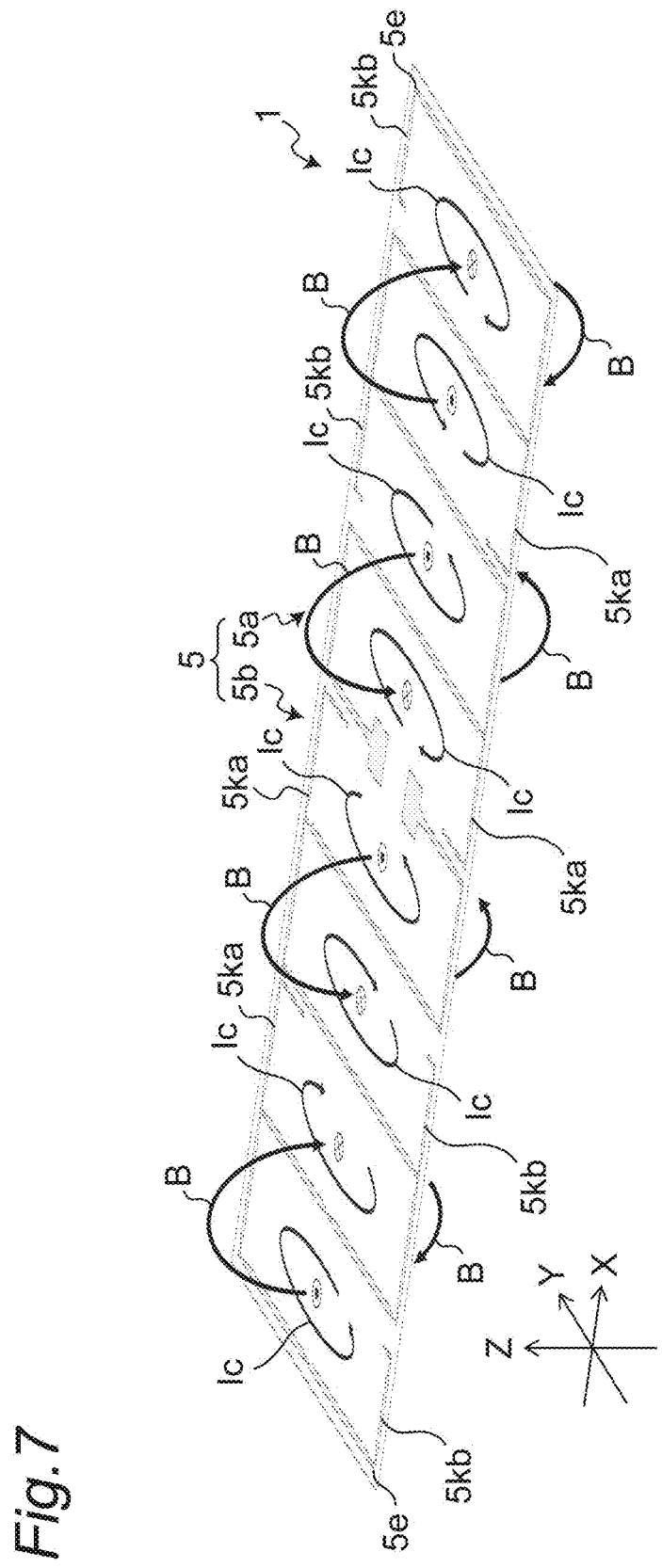
FIG. 7 is a perspective view showing induced currents and magnetic fields occurring in the antenna pattern.

FIG. 6 is a diagram showing an equivalent circuit of the antenna pattern 5 in the RFID tag 1 of the first exemplary embodiment. For the second frequency, an IC parallel resonant circuit S1, S2 is formed for each loop circuit including a turning part 5c of the meandering shape and a first branch pattern. 5ka or a second branch pattern. 5kb confronting the turning part 5c. Therefore, the LC parallel resonant circuit S1, S2 corresponding to the loop circuit is necessarily adjacent to the LC parallel resonant circuit S1, S2 through which induced current flows in the opposite direction. As shown in FIG. 7, a magnetic field B occurs for each LC parallel resonant circuit S1, S2 and a closed magnetic: field B occurs between the adjacent LC parallel resonant circuits S1 and S2. Since an even number of resonant circuits S1 and S2 are formed on each side of the antenna pattern 5 from the land pattern 33, the closed magnetic field B occurs from the paired resonant circuits S1 and S2.

Due to occurrence of this magnetic field B, part of electric power supplied to the antenna pattern 5 turns to magnetic field energy so that magnetic loss of the antenna pattern 5 generates heat, resulting in a gradual energy loss. It is thus possible to attenuate energy in a frequency band higher than the communication frequency. Furthermore, since magnetic field coupling between the LC parallel resonant circuit S1, S2 and the high-frequency wave of the second frequency can be prevented by the closed magnetic field B, the magnetic energy of the high-frequency wave of the second frequency can be prevented from being absorbed into the antenna pattern 5.

Figure 8:
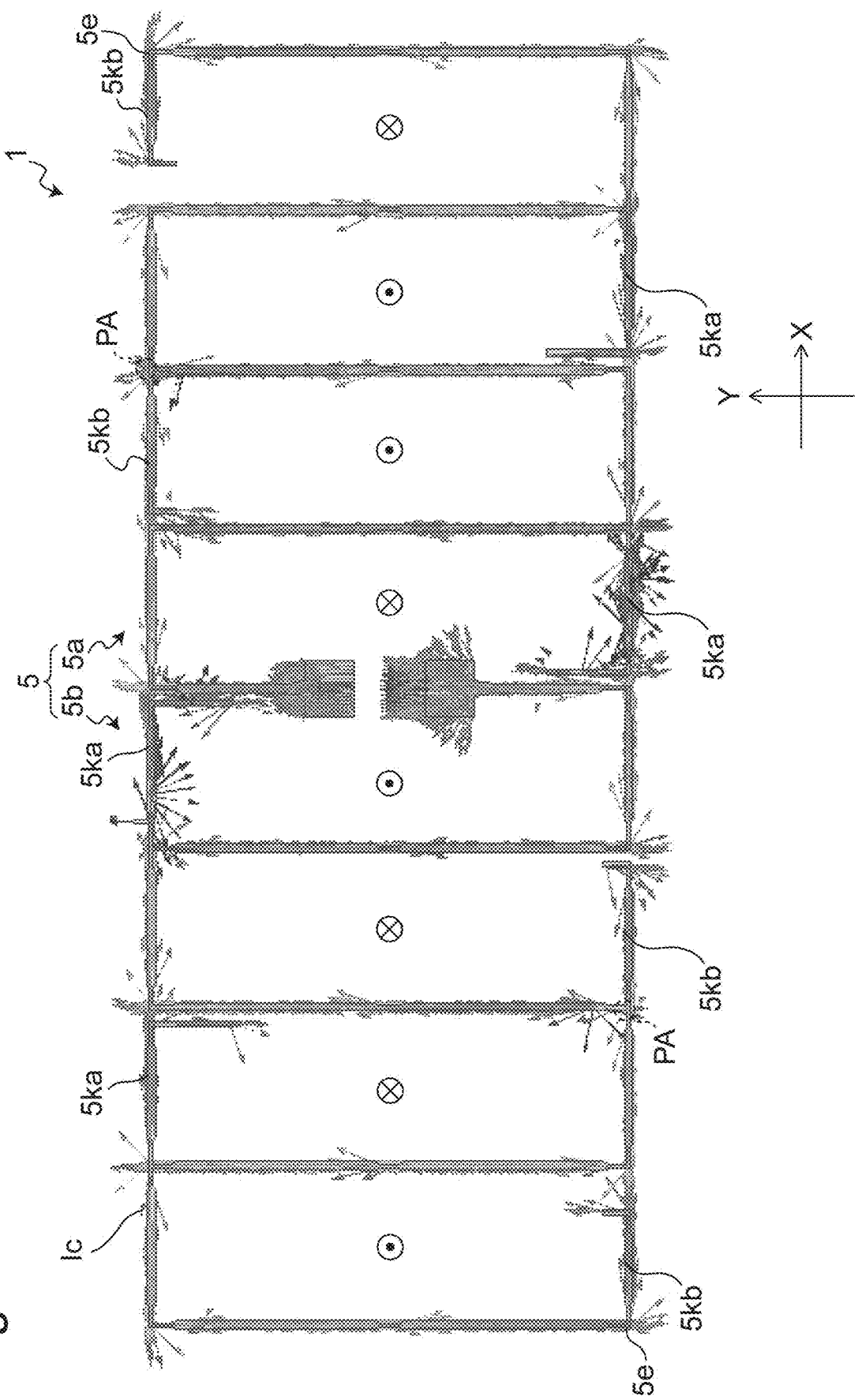
FIG. 8 is a diagram showing the direction of current by a simulation experiment when receiving an electromagnetic wave of a heating frequency of 2.4 GHz used by the electromagnetic wave heating device, in the wireless communication device of the first exemplary embodiment.
Figure 9:
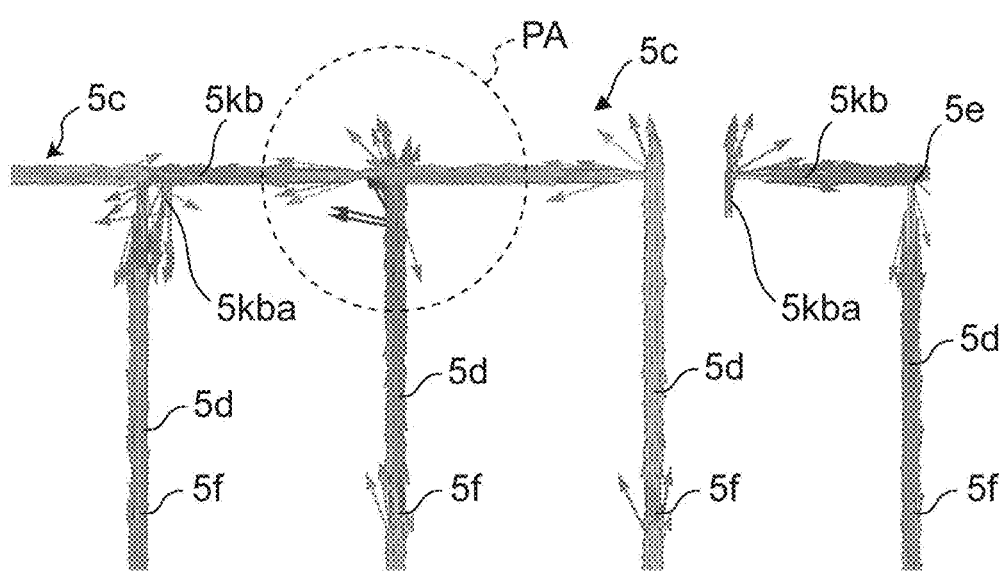
FIG. 9 is a partially enlarged diagram of FIG. 8.

It is noted that the positions indicated by circles PA in FIGS. 8 and 9 are positions of nodes of the standing wave of induced current Ic occurring in the antenna pattern 5. Since the circles PA are the positions of nodes of the induced current, the current value thereat is zero and the direction of the induced current becomes opposite with the circles PA as boundaries. Since the voltage value becomes maximum at the circles PA, they are locations where heat is most easily generated in the antenna pattern 5. Since these locations are formed on the thin wire parts 5g, the configuration is such that disconnection is more likely to occur.

As described above, the RFID tag 1 of the first exemplary embodiment can be used for goods, such as box lunches in convenience stores, for example. Accordingly, a case is assumed for example where the RFID tag 1 is dielectrically heated by a microwave oven, or the like, that is an electromagnetic wave heating device for cooking. The use frequency of microwaves as electromagnetic waves used in the microwave oven is a band of frequencies of 2.4 to 2.5 GHz higher than the communication frequency, for example.

FIG. 8 is an explanatory diagram showing the direction of current flowing through the antenna pattern 5 of FIG. 2 by a simulation experiment when receiving an electromagnetic wave of a high frequency (e.g., 2.4 GHz) higher than the communication frequency. FIG. 9 is a partially enlarged diagram of FIG. 8.

As shown in FIGS. 8 and 9, when the antenna pattern 5 is irradiated with an electromagnetic wave in a band of frequencies higher than the communication frequency, induced current having a reverse point PA where the direction of current is reversed flows through the antenna pattern 5. This induced current Ic causes generation of a magnetic field B from the loop circuit.

The RFID tag 1 of the first embodiment attenuates, for example, a frequency band higher than 1.1 GHz. In particular, it greatly attenuates frequencies (2.4-2.5 GHz) of electromagnetic waves for heating used in the microwave oven that heats box lunches, etc. as goods.

Figure 10:
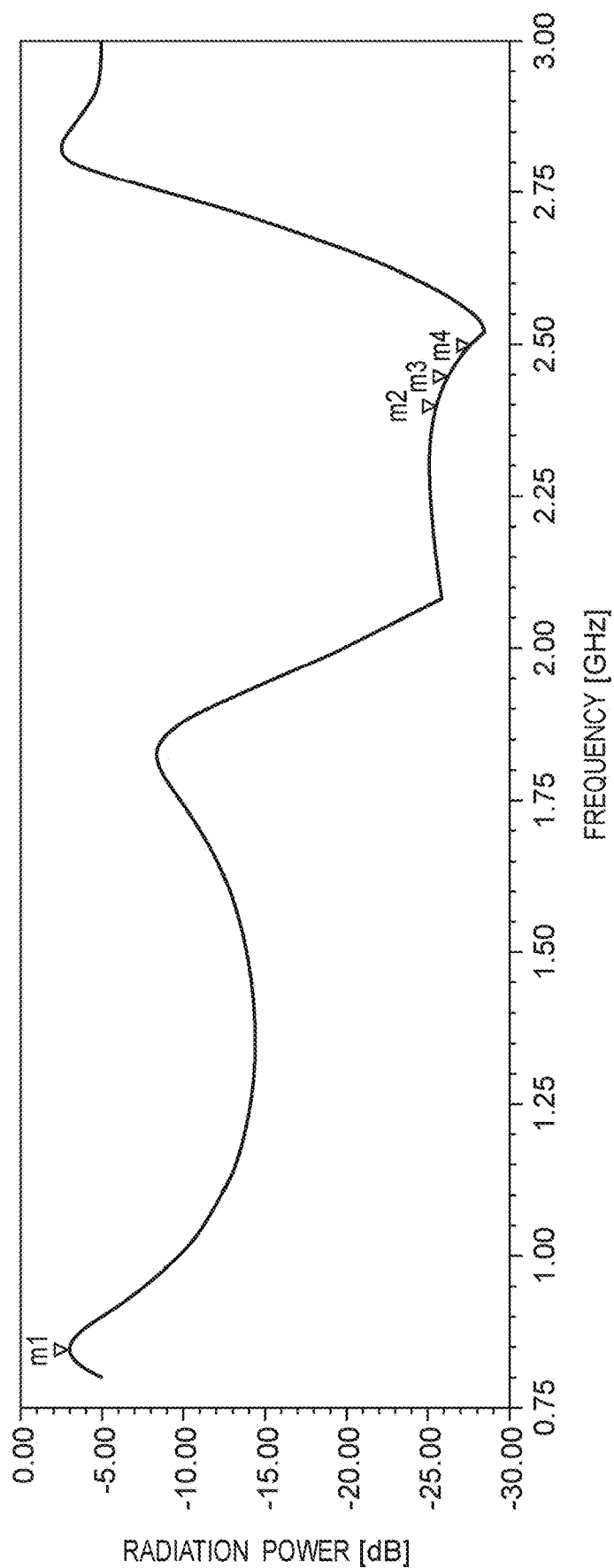
FIG. 10 is a frequency characteristic diagram showing results of the simulation experiment on the wireless communication device of the first embodiment.

FIG. 10 is a frequency characteristic diagram showing results of the simulation experiment effected on the RFID tag 1 of the first embodiment. In the frequency characteristic diagram of the antenna radiation efficiency of FIG. 10, the electricity supply level was −2.9 dB at a frequency of 0.85 GHz designated by $\nabla$m1. At a frequency of 2.4 GHz designated by $\nabla$m2 that is the frequency of the electromagnetic wave for heating used in the microwave oven, the electricity supply level was −25.5 dB, while at a frequency of 2.5 GHz designated by $\nabla$m4, it was −27.6 dB, from which it can be understood that attenuation is achieved to a great extent. It can also be understood that a frequency band higher than the communication frequency is attenuated without being limited to 2.4 to 2.5 GHz. For example, for frequencies above about 1.0 GHz, the electricity supply level is generally attenuated more than −10 dB.

As described above, in the RFID tag 1 of the first embodiment, a high-frequency signal (e.g., a radio signal) having UHF-band communication frequencies (900 MHz band, e.g., 950 MHz) is a transmittable/receivable frequency band and it can be understood that the heating frequencies (e.g., 2.4 to 2.5 GHz) used in the microwave oven as the electromagnetic wave heating device are a frequency band in which the electricity supply level is attenuated to a great extent (about −24 to −34 dB). This indicates that 1000 W power of the electromagnetic wave heating device is attenuated to 4 W to 0.4 W or below and that rapid overheating and ignition are hard to occur.

As described above, the RFID tag 1 of the first embodiment is a wireless communication device for transmitting/receiving a high-frequency signal having a first frequency for communication of a 900 MHz band, for example. The RFID tag 1 comprises the base material 3 made of paper, the antenna pattern 5 made of an Sn alloy formed on the base material 3, and the RFIC chip 37 connected electrically to the antenna pattern 5. The antenna pattern 5 has the thin wire part 5g and the thick wire part 5f that differ in wire width. When the RFID tag 1 is irradiated with an electromagnetic wave of a second frequency higher than the first frequency for communication, the antenna pattern 5 receives energy of the electromagnetic wave and melts. Since the antenna pattern 5 is made of an Sn alloy, it has a melting point lower than the ignition point of the base material 3 made of paper. Accordingly, the base material 3 is prevented from igniting even if the antenna pattern 5 melts. The antenna pattern 5 has the thin wire part 5g narrower in wire width than the thick wire part 5f and more easily breaks at the thin wire part 5g. In this manner, due to disconnection of the antenna pattern 5, current can be restrained from continuing to flow through the antenna pattern 5 to generate heat. Since the temperature of heat generated at the time of disconnection is lower than the ignition point, ignition of the base material 3 and the article 17 as goods can be prevented. Due to use of the paper base material 3 in the RFID tag 1, cost reduction can be implemented as compared with the case of using an expensive heat-resistant resin.

Moreover, the antenna pattern 5 has the plurality of thin wire part 5g. Hereby, even if current by electromagnetic waves with the second frequency flows through the once disconnected antenna pattern 5, disconnection again occurs at a thin wire part 5g, making it possible to restrain current from continuing to flow through the antenna pattern 5 to generate heat.

The antenna pattern 5 has the main antenna pattern 5h having a meandering shape and the branch pattern 5k branching from the main antenna pattern 5h at the turning parts 5c of the meandering shape. The branch pattern 5k extends toward the side opposite to the direction of extension of the meandering shape. The branch pattern 5k extending toward the opposite side to the extension direction of the meandering shape is capacitive coupled with part of the main antenna pattern 5h lying inside in the longitudinal direction of the branched turning parts 5c. Consequently, the branch pattern 5k branching from the main antenna pattern 5h of the meandering shape can form the resonant circuit S1, S2 with a high-frequency wave higher than the first frequency without affecting high-frequency signal transmission/reception using the first frequency.

Moreover, the branch pattern 5k is capacitively coupled with part of the main antenna pattern 5h so that the branch pattern 5k and part of the main antenna pattern 5h form the resonant circuit S1, S2 corresponding to the loop circuit parallel-resonating with a high-frequency wave of the second frequency higher than the first frequency. The resonant circuit S1, S2 as the loop circuit composed of the branch pattern 5k and part of the main antenna pattern 5h can receive a high-frequency wave of the second frequency.

The branch pattern 5k is formed between adjacent turning parts 5c and the number of the loop circuit is even. Since the number of the resonant circuit S1, S2 as the loop circuit for an electromagnetic wave of the second frequency is even, when receiving the electromagnetic wave of the second frequency, current flowing through the antenna pattern 5 can generate a closed magnetic field B between the adjacent resonant circuits S1 and S2. Since this magnetic field B cannot be magnetic field coupled with the electromagnetic wave, the antenna pattern 5 can be prevented from receiving energy by the magnetic field.

The branch pattern 5k may include the first branch pattern 5ka and the second branch pattern 5kb each having a different length. Since the branch patterns 5ka and 5kb each have a different length, the resonant circuits S1 and S2 including the respective branch patterns 5ka and 5kb can have different resonance frequencies. By setting different resonance frequencies in this manner, the antenna pattern 5 can have a resonance frequency band including resonance frequencies between the set different resonance frequencies. Hereby, for example, even if the resonance frequency varies due to the shortened electric length of the antenna pattern 5 under the influence of the dielectric of the article 17 to which the RFID tag 1 is attached, the electromagnetic wave of the second frequency can be used as the resonance frequency of the antenna pattern 5.

The connecting portion between the main antenna pattern 5h and the branch pattern 5k is the thin wire part 5g. By virtue of this configuration, when receiving an electromagnetic wave of a frequency higher than the high-frequency signal of the first frequency, break can occur at the connecting portion between the main antenna pattern 5h and the branch pattern 5k.

Moreover, the corners of the main antenna pattern 5h are the thin wire parts 5g. By virtue of this configuration, when receiving an electromagnetic wave of the second frequency, break can occur at the corners of the main antenna pattern 5h where current concentrates easily, making it possible to prevent ignition of the antenna pattern 5.

The main antenna pattern 5h may have the thin wire parts at the central portions in the amplitude direction of the meander. By virtue of this configuration, when receiving an electromagnetic wave of a frequency higher than the high-frequency signal of the first frequency, break can occur at the central portions in the amplitude direction of the meander of the main antenna pattern 5h.

The thin wire parts 5g of the antenna pattern 5 are arranged at locations where voltage occurring at the antenna pattern 5 becomes maximum when receiving a high-frequency wave of the second frequency higher than the first frequency. Since this configuration allows the thin wire parts 5g to become locations having the maximum voltage, the thin wire parts 5g break before being heated excessively, making it possible to prevent the base material 3 from burning.

The thin wire parts 5g of the antenna pattern 5 are arranged at locations where current flowing through the antenna pattern 5 becomes maximum when receiving a high-frequency wave of the second frequency higher than the first frequency. Since this configuration allows the thin wire parts 5g to become locations having the maximum voltage, the thin wire parts 5g break before being heated excessively, making it possible to prevent the base material 3 from burning.

The second frequency may be a frequency used in electromagnetic wave heating. Even if the RFID tag 1 is irradiated with high-frequency waves of the frequency used in electromagnetic wave heating, the article 17 with the RFID tag 1 can be prevented from burning.

The first frequency is a UHF-band frequency. As long as the first frequency is the UHF-band frequency, the RFID tag 1 having a long communication distance can be implemented.

Figure 11:
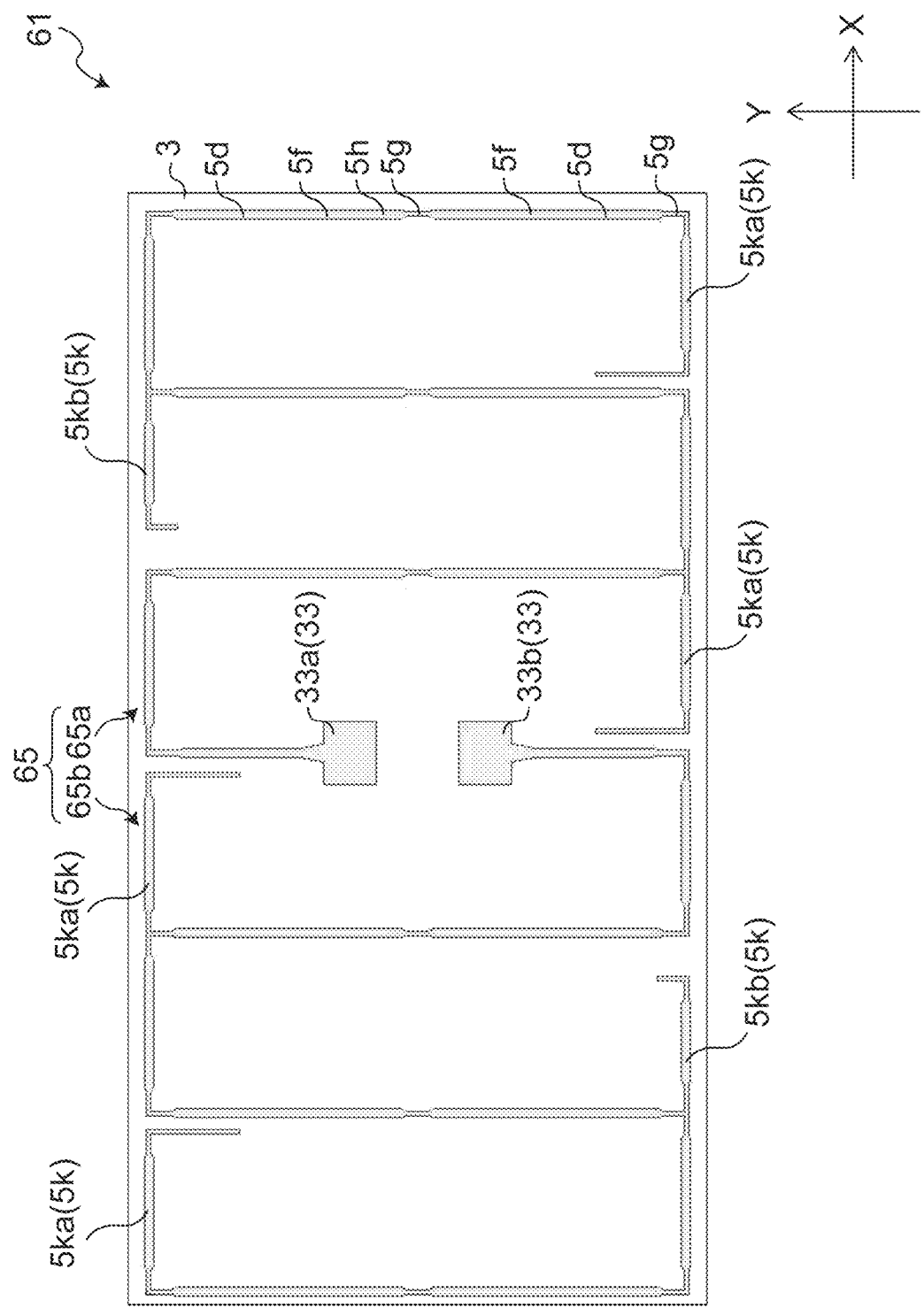
FIG. 11 is a plan view showing a wireless communication device (RFID tag) of a first variant of the first exemplary embodiment.
Figure 12:
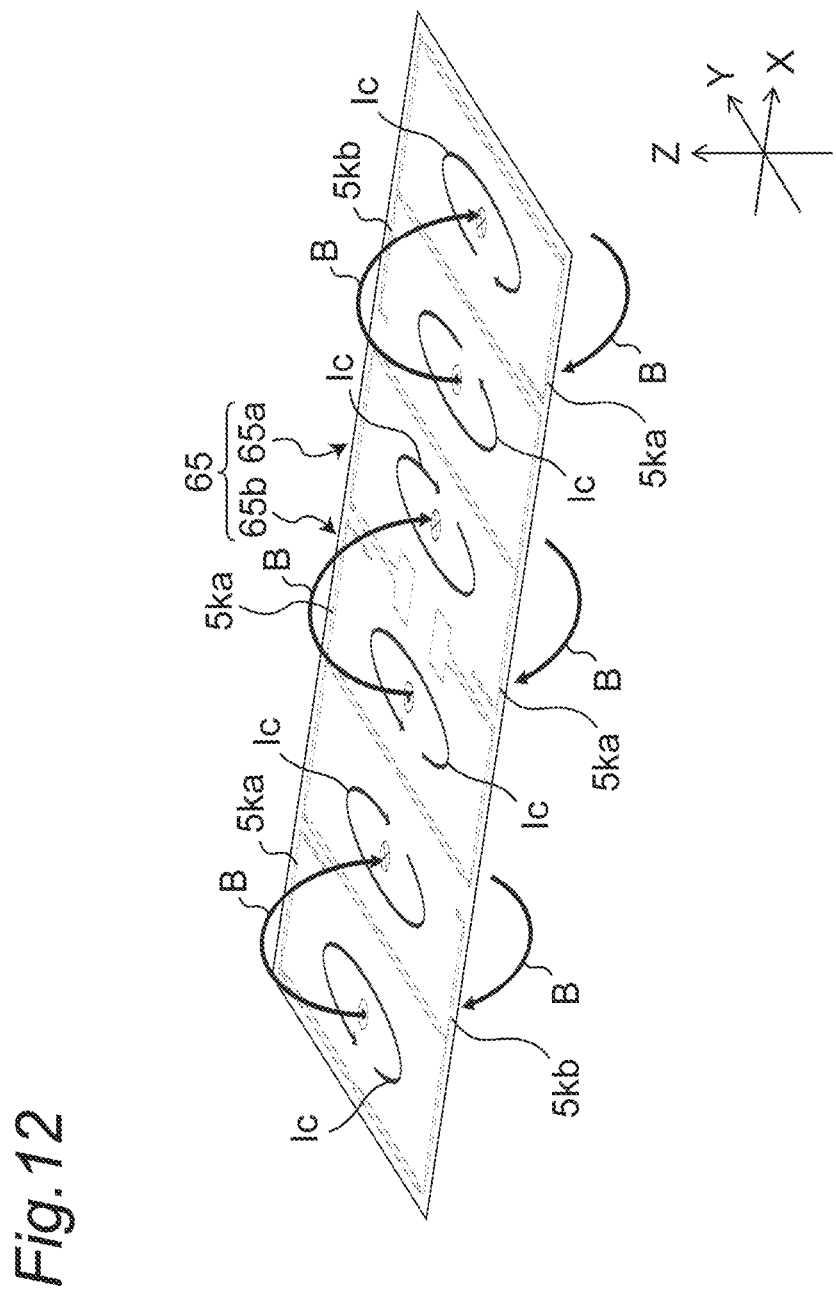
FIG. 12 is a perspective view showing magnetic fields occurring from the wireless communication device (RFID tag) of the first variant of the first exemplary embodiment.

A variant of the first embodiment will then be described. FIG. 11 is a plan view showing a configuration of a wireless communication device (e.g., an RFID tag) in the variant of the first embodiment. An RFID tag 61 has a configuration in which one resonant circuit S1 is excluded from each of the first antenna pattern 5a and the second antenna pattern 5b of the RFID tag 1 of the first embodiment. The other configurations are substantially the same as those of the RFID tag 1 of the first embodiment.

In the RFID tag 61, the first antenna pattern 65a and the second antenna pattern 65b each have an odd number of branch patterns 5k. Hence, a closed magnetic field B arising from induced current caused by reception of the second high-frequency wave is formed with the land 33 in between. Although an odd number of resonant circuits are formed on each side of the land 33, the antenna pattern 5 as a whole has an even number of resonant circuits. Since this configuration allows adjacent resonant circuits to form the closed magnetic field B, the magnetic field coupling between the antenna pattern 65 and the electromagnetic wave of the second high frequency can be prevented so that current flowing through the antenna pattern 65 can be suppressed.

Second Exemplary Embodiment

Figure 13:
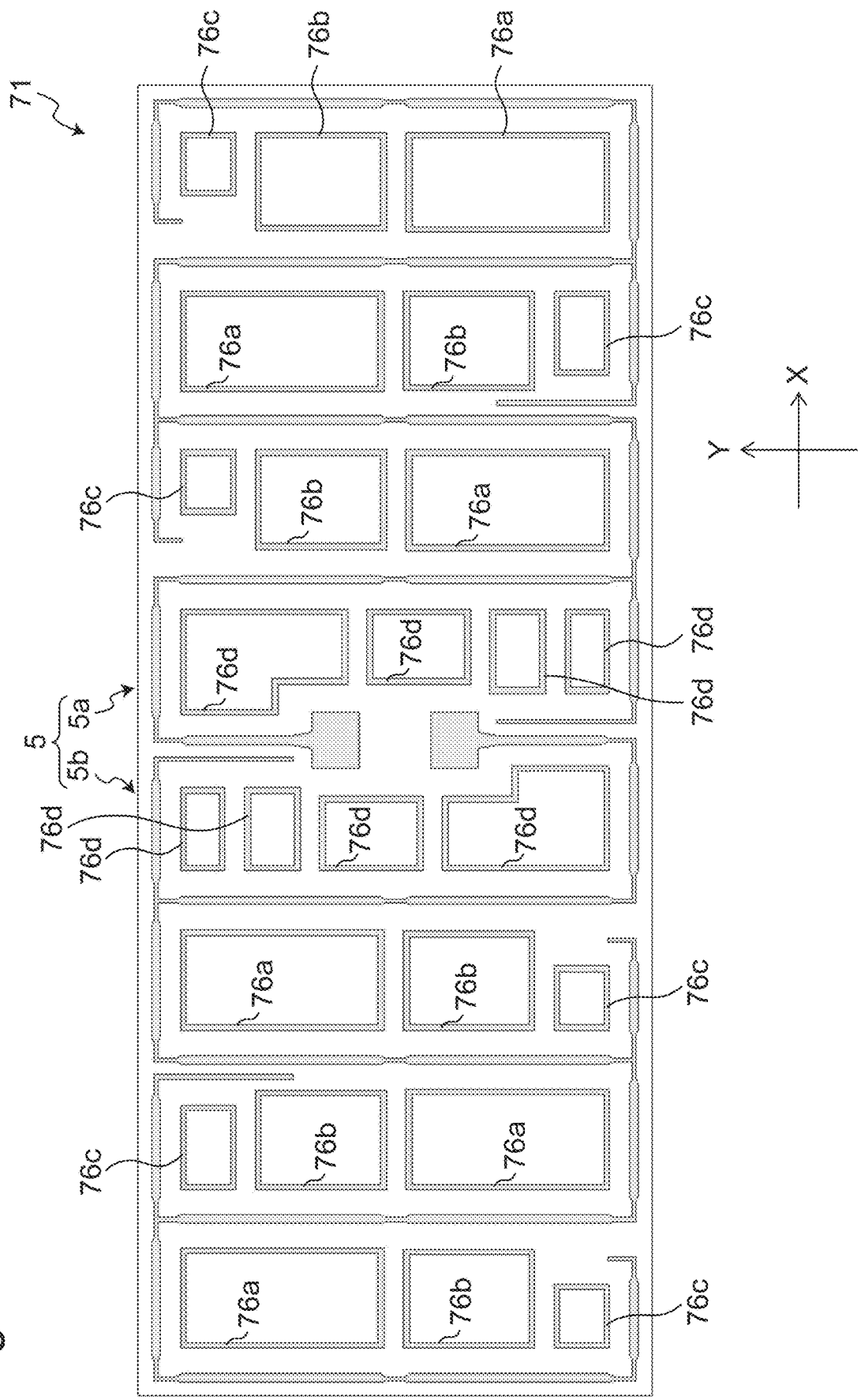
FIG. 13 is a plan view showing a wireless communication device (RFID tag) of a second exemplary embodiment.

Referring to FIG. 13, description will hereinafter be given of an RFID tag 71 that is a wireless communication device of a second exemplary embodiment. FIG. 13 is a plan view showing a configuration of the RFID tag 71 of the second embodiment.

As for the RFID tag 71 of the second embodiment, difference from the RFID tag 1 of the first embodiment will mainly be described. In the description of the second embodiment, the same reference numerals are imparted to elements having similar configurations, actions, and functions to those of the first embodiment described above, of which explanations may be omitted to avoid duplicate description.

The RFID tag 71 of the second embodiment comprises a conductor pattern 76 along the meandering antenna pattern 5. The conductor pattern 76 includes a first conductor pattern 76a, a second conductor pattern 76b, and a third conductor pattern 76c that each have a rectangular loop shape with a different circumferential length. The first to third conductor patterns 76a to 76c are formed between adjacent rectilinear parts 5d of each of the first and second antenna patterns 5a and 5b. The conductor pattern 76 further includes a forth conductor pattern 76d having some different circumferential lengths, arranged around the land pattern 33. In this exemplary aspect, the wire width of the conductor pattern 76 is thinner than that of the first and second antenna patterns 5a and 5b and is, for example, 100 μm. Moreover, the distance between the conductor patterns 76 is 400 μm, for example.

The electrical circumferential length of the conductor pattern 76 is shorter than the half wavelength of the high-frequency signal of a first frequency in a 900 MHz band for example. Hereby, the conductor pattern 76 does not generate any reverse points where the direction of induced current by the high-frequency signal of the first frequency is reversed. It is thus possible to reduce the influence on the standing wave occurring in the antenna pattern 5.

The electrical circumferential length of the conductor pattern 76 is not an integral multiple of the wavelength of the high-frequency wave of the second frequency higher than the first frequency. As a result, the standing wave of the second frequency is not generated in the conductor pattern making it possible to reduce accumulation of energy into the conductor pattern 76 caused by the electromagnetic wave of the second frequency.

When the RFID tag 1 is dielectrically heated by the electromagnetic wave heating device, induced current flows through the conductor pattern 76. This configuration enables the conductor pattern 76 to act as a small-sized magnetic field antenna at the frequency of the electromagnetic wave heating device, leading to a configuration reflecting electric field energy radiated from the electromagnetic wave heating device, to thereby render reception thereof difficult. As a result, the RFID tag 71 acquires a configuration where it is hard to ignite by the electromagnetic wave heating device and further where received electric field energy (e.g., electric power) can be reflected or lost as magnetic field energy. Accordingly, the RFID tag 71 of the second embodiment has a configuration such that the electricity supply level can greatly be attenuated at the time of dielectric heating.

Since the RFID tag 71 comprises the plurality of first to third conductor patterns 76a to 76c as the loop-like conductor patterns, energy irradiated around the antenna pattern 5 can further be reduced also in the antenna pattern 5. Since the adjacent first and second conductor patterns 76a and 76b and the adjacent second and third conductor patterns 76b and 76c have their different respective circumferential lengths, the first to third conductor patterns 76a to 76c have their different respective magnetic field antenna frequencies, thereby configuring a wideband magnetic field antenna of 2.4 GHz to 2.5 GHz band or above as a whole.

Although the fourth conductor pattern 76d is formed of an Sn alloy similarly to the antenna pattern 5, it is noted that the fourth conductor pattern 76d can be formed of a conductive material such as aluminum foil and copper foil. Current flows through the fourth conductor pattern. 76d in the direction cancelling a magnetic field generated by current flowing between the antenna pattern 5 and the land patterns 33a and 33b.

Since the fourth conductor pattern 76d is closer in shape to a square than the first conductor pattern 76a, the Q characteristic of the inductance element configured by this pattern becomes higher than the Q characteristic of the inductance element formed by the first conductor pattern 76a, with the result that it becomes easier to suppress heat generation and ignition caused by magnetic loss. Due to the fourth conductor pattern 76 arranged in the central portion in the longitudinal direction of the base material 3, there is no heat generation by eddy current resulting in disconnection, even if irradiated with an electromagnetic wave of a frequency band higher than the communication frequency.

The conductor pattern 76 is formed of an Sn alloy, similarly to the antenna pattern 5. The thickness of the conductor pattern 76 is 10 µm to 30 µm, for example, similar to the antenna pattern 5.

In this manner, the loop-like conductor pattern 76 is disposed along the meandering main antenna pattern 5h. Since the conductor pattern 76 generates a magnetic field as the magnetic field antenna, the radiation characteristic of the antenna pattern 5 at the second frequency is deteriorated. Accordingly, the antenna pattern 5 is impeded from functioning as an antenna at the second frequency, enabling reduction in accumulation of energy of the electromagnetic wave of the second frequency into the base material 3. As a result, goods can be prevented from burning.

Even when a minute current flows through the RFID tag 71 of the second embodiment, the minute current is transmitted from the antenna pattern 5 to the conductor pattern 76 by capacitive coupling so that heat is generated by the magnetic loss of the conductor pattern 76 forming the magnetic field antenna, resulting in a gradual energy loss.

As set forth hereinabove, according to these embodiments, even when goods with the wireless communication device are accidentally heated by the electromagnetic wave heating device with the wireless communication device being attached thereto, the occurrence of discharge in the wireless communication device is suppressed. Consequently, there can be provided a wireless communication device with a high safety and reliability constructed to prevent the risks of ignition of the wireless communication device and of ignition in goods with the wireless communication device. Thus, the present invention can build a system automating the accounting and bagging of purchased goods in stores such as convenience stores handling a wide variety of goods such as food and daily necessities.

It is noted that the present invention can be modified and carried out as follows without being limited to the above embodiments.

(1) Although in the above embodiments paper was used as the material of the base material 3, this is not limitative. The base material 3 may be, for example, a flexible film material or a flame-retardant film material. In the case of employing the flame-retardant film as the base material 3, examples of the flame-retardant film used include a film obtained by adding a halogen flame-retardant material to a resin material, such as PET (polyethylene terephthalate) resin and PPS (polyphenylene sulfide) resin or by applying a flame-retardant coating material thereto. The material of the base material 3 used may be a resin material with a high function such as PEN (polyethylene naphthalate) resin having a heat resistance.

(2) Although in the above embodiments the first frequency for communication was in the UHF band, this is not limitative. Configuration may be such that wireless communication is made using a high-frequency signal having a frequency (carrier frequency) for HF-band communication. In this case, the full length of the antenna pattern is designed so as to receive the HF-band high-frequency signal. The HF-band is a frequency band of 13 MHz or above and 15 MHz or below.

(3) Although in the above embodiments the antenna patterns 5a and 5b of the antenna pattern 5 were both meander-shaped antenna patterns, this is not limitative. Either the antenna pattern 5a or the antenna pattern 5b may be a flat-plate-like antenna pattern. For example, the second antenna pattern 5b of the antenna pattern 5 has an extension part derived from the second land pattern 33b and extending rectilinearly toward the other end in the longitudinal direction of the base material 3, with a tip in the extending direction of the extension part being formed with a flat-plate part. This flat-plate part is a portion attached to a metal surface of an article. When this flat-plate part is attached to an article having a metal surface on its external surface like can products for example, the metal surface of the article works as part of the antenna.

Although the exemplary embodiments of the present invention have been described in each of the embodiments with some detail, the contents of disclosure of these embodiments should change in the details of the configuration, and changes of combinations and orders of elements in each embodiment can be implemented without departing from the exemplary aspects of the present invention as described above.

EXPLANATIONS OF LETTERS OR NUMERALS

1 RFID tag
3 base material
5 antenna pattern
5a first antenna pattern
5b second antenna pattern
5c turning part
5d rectilinear part
5e tip
5f thick wire part
5g thin wire part
5h main antenna pattern
5k branch pattern
5ka first branch pattern
5kaa facing part
5kb second branch pattern
5kba facing part
7 RFIC package
17 article
33 land pattern
33a first land pattern
33b second land pattern
35A, 35B, 35C insulating sheet
37 RFIC chip
37a, 37b input/output terminal
39A, 39B, 39C, 39D inductance element
39Aa, 39Ba, 39Ca, 39Da land
39Ab, 39Bb land
41 external connection terminal
41a first external connection terminal
41b second external connection terminal
43 through-hole
61 RFID tag
65 antenna pattern
65a first antenna pattern
65b second antenna pattern
71 RFID tag
76 conductor pattern
76a first conductor pattern
76b second conductor pattern
76c third conductor pattern
76d fourth conductor pattern

What is claimed:

1. A wireless communication device for transmitting and receiving a high-frequency signal having a first frequency as a carrier frequency, comprising:
   a base material formed of paper;
   an antenna pattern of a Sn alloy and that is disposed on the base material; and
   an RFIC element connected electrically to the antenna pattern, wherein
   the antenna pattern includes a main antenna pattern of a meandering shape, and
   the main antenna pattern includes a first antenna pattern that extends in an amplitude direction of the meandering shape and a turning pattern where a direction of extension of the main antenna pattern is reversed, and
   the antenna pattern includes loop patterns, each including the first antenna pattern, the turning pattern, and an opening, with each of the loop patterns including a thin wire part and a thick wire part that each have a different wire width with respect to each other.

2. The wireless communication device of claim 1, wherein the antenna pattern includes a plurality of the thin wire parts.

3. The wireless communication device of claim 1, wherein the antenna pattern includes a branch pattern branching from the main antenna pattern at the turning patterns and extending towards a side opposite to a direction of extension of the meandering shape.

4. The wireless communication device of claim 3,
   wherein the branch pattern is disposed between the turning patterns adjacent to each other, and
   wherein the loop pattern further includes the branch pattern and forms a loop circuit constructed to resonate with a high-frequency wave of a second frequency higher than the first frequency.

5. The wireless communication device of claim 4, wherein the loop circuit comprises a plurality of loop circuits of an even number.

6. The wireless communication device of claim 3, wherein the branch pattern includes a first branch pattern and a second branch pattern each having a different length.

7. The wireless communication device of claim 3, wherein the thin wire part is a connecting portion between the main antenna pattern and the branch pattern.

8. The wireless communication device of claim 3, wherein the thin wire part comprises a corner of the main antenna pattern.

9. The wireless communication device of claim 3, wherein the thin wire part comprises a central portion in an amplitude direction of a meander of the main antenna pattern.

10. The wireless communication device of claim 4, wherein a looped conductor pattern is disposed along the main antenna pattern of the meander shape.

11. The wireless communication device of claim 1, wherein the thin wire part is arranged at a location where a voltage occurring at the antenna pattern is maximized when receiving a high-frequency wave of a second frequency higher than the first frequency.

12. The wireless communication device of claim 1, wherein the thin wire part is arranged at a location where a current flowing through the antenna pattern is maximized when receiving a high-frequency wave of a second frequency higher than the first frequency.

13. The wireless communication device of claim 4, wherein the second frequency is a frequency used in electromagnetic wave heating.

14. The wireless communication device of claim 1, wherein the first frequency is a frequency in a UHF band.

15. A wireless communication device for transmitting and receiving a high-frequency signal having a first frequency as a carrier frequency, comprising:
   a base material;
   an antenna pattern disposed on the base material and having a thin wire part and a thick wire part that each have a different wire width with respect to one other; and
   an RFIC element connected electrically to the antenna pattern, wherein
   the antenna pattern includes a main antenna pattern of a meandering shape, and
   the main antenna pattern includes a first antenna pattern that extends in an amplitude direction of the meandering shape and a turning pattern where a direction of extension of the main antenna pattern is reversed, and
   the antenna pattern includes loop patterns, each including the first antenna pattern, the turning pattern, and an opening, with each of the loop patterns including a thin wire part and a thick wire part that each have a different wire width with respect to each other, and wherein the antenna pattern comprises a material with a lower melting point than an ignition point of the base material.

16. The wireless communication device of claim 15, wherein the base material comprises paper and the antenna pattern comprises a Sn alloy.

17. The wireless communication device of claim 15, wherein the base material comprises one of a flexible film material and a flame-retardant film material.

18. The wireless communication device of claim 15, wherein the antenna pattern includes a branch pattern branching from the main antenna pattern at the turning patterns of the meandering shape and extending towards a side opposite to a direction of extension of the meandering shape.

19. The wireless communication device of claim 18, wherein the branch pattern is disposed between the turning patterns adjacent to each other, and wherein the loop pattern further includes the branch pattern and forms a loop circuit constructed to resonate with a high-frequency wave of a second frequency higher than the first frequency.

20. The wireless communication device of claim 19, wherein the loop circuit comprises a plurality of loop circuits of an even number.

\* \* \* \* \*